US012580743B2

(12) United States Patent
Yamada

(10) Patent No.: US 12,580,743 B2
(45) Date of Patent: Mar. 17, 2026

(54) INFORMATION PROCESSING METHOD

(71) Applicant: Reazon Holdings, Inc., Tokyo (JP)

(72) Inventor: Taikou Yamada, Tokyo (JP)

(73) Assignee: Reazon Holdings, Inc., Tokyo (JP)

( * ) Notice: Subject to any disclaimer, the term of this patent is extended or adjusted under 35 U.S.C. 154(b) by 29 days.

(21) Appl. No.: 18/668,616

(22) Filed: May 20, 2024

(65) Prior Publication Data

US 2024/0396715 A1 Nov. 28, 2024

(30) Foreign Application Priority Data

May 23, 2023 (JP) ................................. 2023-084562

(51) Int. Cl.
*H04L 9/08* (2006.01)

(52) U.S. Cl.
CPC .................................. *H04L 9/0825* (2013.01)

(58) Field of Classification Search
CPC ............................. H04L 9/0825; H04L 9/0894
See application file for complete search history.

(56) References Cited

U.S. PATENT DOCUMENTS

| | | | | | |
|---|---|---|---|---|---|
| 2004/0078775 | A1* | 4/2004 | Chow | ..................... | G06F 21/31 |
| | | | | | 717/100 |
| 2015/0006895 | A1* | 1/2015 | Irvine | ................. | G06F 21/6209 |
| | | | | | 713/171 |
| 2018/0367316 | A1* | 12/2018 | Cheng | ..................... | G06F 21/72 |

| | | | | | |
|---|---|---|---|---|---|
| 2019/0245688 | A1* | 8/2019 | Patin | ....................... | H04L 9/321 |
| 2019/0280863 | A1* | 9/2019 | Meyer | ....................... | H04L 9/50 |
| 2019/0280864 | A1* | 9/2019 | Cheng | ................... | H04L 9/3247 |
| 2020/0259638 | A1* | 8/2020 | Carmignani | ............ | H04L 9/085 |
| 2020/0389306 | A1* | 12/2020 | Dolan | ................... | H04L 9/3252 |
| 2021/0083872 | A1* | 3/2021 | Desmarais | ............ | H04L 9/0894 |
| 2021/0105142 | A1* | 4/2021 | Lee | ......................... | G06F 21/31 |
| 2021/0357915 | A1* | 11/2021 | Makrides | ............. | G06Q 20/384 |
| 2022/0114584 | A1* | 4/2022 | Conley | ............. | G06Q 20/3674 |
| 2022/0224530 | A1* | 7/2022 | Jeoung | ................. | H04L 63/126 |
| 2022/0239489 | A1* | 7/2022 | Maruyama | ............ | H04L 9/3221 |
| 2022/0271933 | A1* | 8/2022 | Chen | ....................... | H04L 9/085 |
| 2022/0321340 | A1* | 10/2022 | Tsitrin | ................... | H04L 9/0838 |
| 2022/0327525 | A1* | 10/2022 | Tsitrin | ................... | H04L 9/0897 |

(Continued)

FOREIGN PATENT DOCUMENTS

| | | |
|---|---|---|
| CN | 111431713 | 7/2020 |
| JP | 2020-155911 | 9/2020 |

(Continued)

OTHER PUBLICATIONS

Office Action mailed on Nov. 21, 2025 with respect to the basic Japanese patent application No. 2023-084562.

*Primary Examiner* — J. Brant Murphy

(74) *Attorney, Agent, or Firm* — IPUSA, PLLC

(57) ABSTRACT

An information processing method includes causing a terminal device of a user to generate first information and second information that are required to recover a private key of a software wallet of the user; causing the terminal device to transmit, to a server, the second information in association with a user identifier; and causing the server to transmit the second information to the terminal device, in response to an event in which the server receives, from the terminal device, the user identifier and a request for the second information.

17 Claims, 8 Drawing Sheets

(56)            References Cited

U.S. PATENT DOCUMENTS

| 2023/0274269 A1* | 8/2023 | Conley | ................. | G06Q 20/02 |
| | | | | 705/75 |
| 2024/0135364 A1* | 4/2024 | Agudelo | ............. | G06Q 20/389 |
| 2024/0362623 A1* | 10/2024 | Posner | ............. | G06Q 20/3829 |
| 2024/0405980 A1* | 12/2024 | Chang | ................. | H04L 9/3247 |

FOREIGN PATENT DOCUMENTS

| KR | 2021-0045326 | 4/2021 |
| WO | 2020/246402 | 12/2020 |

* cited by examiner

FIG.3

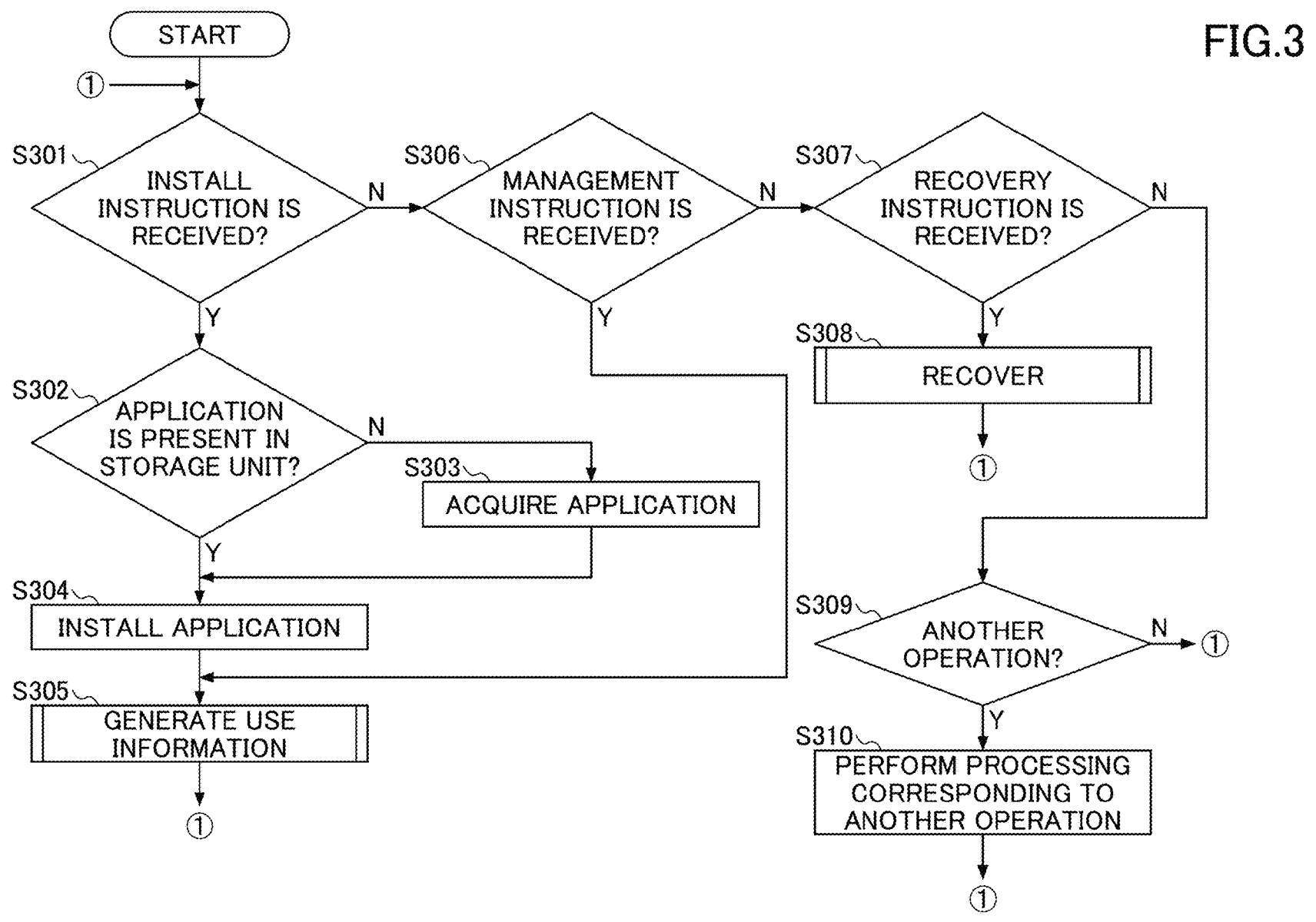

START

S301 — INSTALL INSTRUCTION IS RECEIVED?

S302 — APPLICATION IS PRESENT IN STORAGE UNIT?

S303 — ACQUIRE APPLICATION

S304 — INSTALL APPLICATION

S305 — GENERATE USE INFORMATION

S306 — MANAGEMENT INSTRUCTION IS RECEIVED?

S307 — RECOVERY INSTRUCTION IS RECEIVED?

S308 — RECOVER

S309 — ANOTHER OPERATION?

S310 — PERFORM PROCESSING CORRESPONDING TO ANOTHER OPERATION

| ID | USER IDENTIFIER | RECOVERY PHRASE |
|----|-----------------|-----------------|
| 1 | abc@x.com | XXXyyy0123 |
| 2 | 09011115432 | AAA9876bbb |
| 3 | def@y.co.jp | BBB1234XXX |
| ⋮ | ⋮ | ⋮ |

FIG.9

INFORMATION PROCESSING METHOD

CROSS-REFERENCE TO RELATED APPLICATIONS

This patent application is based on and claims priority to Japanese Patent Application No. 2023-084562 filed on May 23, 2023, the entire contents of which are incorporated herein by reference.

TECHNICAL FIELD

The present disclosure relates to a terminal device and the like configured to safely recover a private key of a software wallet.

BACKGROUND

There is a technique for realizing an electronic tally type storage method having high data leakage resistance against hacking from the outside by dividing a private key into multiple pieces, and storing the divided pieces of the private key in multiple anonymous nodes on an autonomous distributed network, and an operation system thereof (see Patent Document 1).

Additionally, as a method of managing a private key of a software wallet, a user needs to write the private key or a code obtained by encoding the private key into an English word on paper. The reason why the server cannot keep the private key of the software wallet is that it results in the server keeping the asset control right of a wallet user.

Related Art Document

Patent Document

[Patent Document 1] Japanese Laid-open Patent Application Publication No. 2020-155911

SUMMARY

According to one embodiment of the present disclosure, an information processing method includes causing a terminal device of a user to generate first information and second information that are required to recover a private key of a software wallet of the user; causing the terminal device to transmit, to a server, the second information in association with a user identifier; and causing the server to transmit the second information to the terminal device, in response to an event in which the server receives, from the terminal device, the user identifier and a request for the second information.

BRIEF DESCRIPTION OF THE DRAWINGS

FIG. 3 is a flowchart for explaining an operation example of a terminal device 1;

FIG. 9 is a block diagram of the computer system.

DETAILED DESCRIPTION OF EMBODIMENTS

Figure 1:
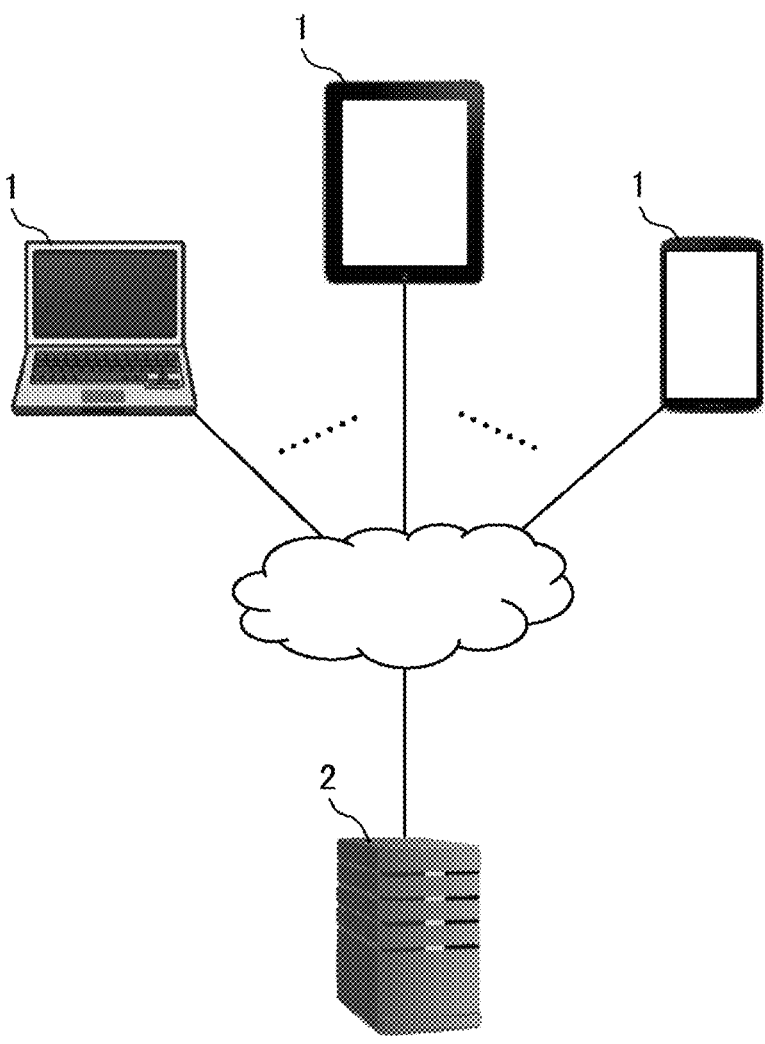
FIG. 1 is a conceptual diagram of an information system A according to one embodiment.

According to the present disclosure, for example, one of two elements necessary for recovering a private key is deposited in a server (management device). When the one element is extracted, authentication such as a telephone number, a mail address, or an SNS is used. The other is kept by a user as an image or the like. This provides convenience while ensuring safety and transparency.

According to one embodiment of the present disclosure, a terminal device includes circuitry configured to generate a private key of a software wallet; generate a decryption code; generate a recovery phrase by performing reversible encryption on the private key by using the decryption code; transmit, to a management device, the recovery phrase in association with a user identifier; and output use information generated based on the decryption code.

With such a configuration, in a case where a private key of a software wallet is lost or the like, a terminal that can safely recover the private key can be provided.

The circuitry of the terminal device may be further configured to transmit, to the management device, a recovery instruction associated with the user identifier; receive the recovery phrase associated with the user identifier from the management device in response to the transmission of the recovery instruction; and acquire the use information; acquire the private key by using the received recovery phrase and the decryption code associated with the use information; and output the acquired private key.

With such a configuration, in a case where a private key of a software wallet is lost or the like, a terminal that can safely recover the private key can be provided.

According to one embodiment of the present disclosure, a management device comprising: a processor; and a memory storing program instructions that cause the processor to: receive a recovery phrase in association with a user identifier from a terminal device; store, in the memory, the recovery phrase in association with the user identifier; and receive a recovery instruction associated with the user identifier from the terminal device; acquire the recovery phrase associated with the user identifier associated with the recovery instruction; and transmit the recovery phrase to the terminal device.

With such a configuration, in a case where a private key of a software wallet is lost or the like, a server that can support safe recovery of the private key can be provided.

According to the terminal device of the present disclosure, in a case where a private key of a software wallet is lost, the private key can be safely recovered.

In the following, embodiments such as a terminal device and the like will be described with reference to the drawings. Here, in the embodiments, components denoted by the same reference symbols perform the same operations, and thus the description thereof may be omitted.

In one embodiment, an information system that can safely recover a private key of a software wallet even when the private key is lost will be described.

Hereinafter, features of the present disclosure will be described by using an example in comparison with the related art. The present disclosure is not limited to the following description.

A technique of causing a user to manage a mnemonic phrase for recovering a private key is known. Specifically, an example of the technique is causing a user to take a note of a mnemonic phrase. However, the mnemonic phrase is substantially synonymous with the private key, and is substantially the same as taking a note of the private key itself. This is not a desired way to manage a private key for a user. Additionally, there is also a high risk when a user loses a mnemonic phrase. Here, the loss of the private key occurs, for example, when a user deletes an application of a software wallet installed in a smartphone or when a user changes his/her smartphone. Additionally, when the smartphone is lost, dropped in water, broken, or the like, the loss of the private key may occur.

The technique of the present disclosure is a new technique different from the above-described technique. More specifically, the present disclosure uses, as information necessary to recover the private key, image information such as a QR code, which is the information stored by the user at hand and information managed by a server (in one embodiment, a recovery phrase). That is, in order to recover the private key in the present disclosure, both the image information and the recovery phrase are required.

The image information such as the QR code is information that the user stores (manages) at hand (stores in a terminal device of the user). This allows the user to manage the QR code instead of the mnemonic phrase, which simplifies the management. Here, a decryption code, which is information for recovering the private key, may be embedded in the QR code.

In order to receive (acquire) the recovery phrase from the server, it is necessary to transmit a user identifier to the server. Therefore, the present disclosure has higher security than the conventional technique.

Here, the recovery phrase is not managed by the user side, and is managed (stored) only by the server. The server manages (stores) the recovery phrase in association with the user identifier. With this, the information for recovering the private key can be stored in two different locations, i.e., the terminal device of the user and the server, instead of storing the private key information itself in one location.

Here, the recovery phrase is generated by reversibly encrypting the private key by using the decryption code. Additionally, the decryption code and the recovery phrase are generated in the terminal device of the user, and the decryption code is embedded in the QR code and stored in the terminal device, and the recovery phrase is transmitted to the server in association with the user identifier. Additionally, the recovery phrase is not stored in the terminal device, and the QR code is not transmitted to the server.

The user who has lost the private key transmits the user identifier from the terminal device to the server, and then the server transmits the recovery phrase associated with the received user identifier to the terminal device of the user. With this, the QR code in which the decryption code is embedded and the recovery phrase are all present in the terminal device of the user, and the user can recover the private key by using these information.

Further, in the present disclosure, a telephone number is used as the user identifier. This is because, even when the terminal device such as a smartphone is lost, the telephone number can be restored by a procedure submitted to a centralized organization, i.e., a communication carrier. Here, the user identifier is not limited to a telephone number, and may be a mail address of the user.

In the present specification, the description that information X is associated with information Y indicates that the information Y can be obtained from the information X or the information X can be obtained from the information Y, and the association method is not limited. The information X and the information Y may be linked to each other, may be present in the same buffer, the information X may be included in the information Y, the information Y may be included in the information X, or the like.

FIG. 1 is a conceptual diagram of an information system A according to the present embodiment. The information system A includes one or more terminal devices 1 and a management device 2.

The terminal device 1 is a terminal that can safely recover a private key of a software wallet when the private key is lost or the like. The terminal device 1 is, for example, what is called a personal computer, a smartphone, or a tablet terminal, but the type thereof is not limited.

The management device 2 is a device that manages a recovery phrase, which will be described later, in association with a user identifier.

The one or more terminal devices 1 and the management device 2 can communicate with each other via a network such as the Internet.

Figure 2:
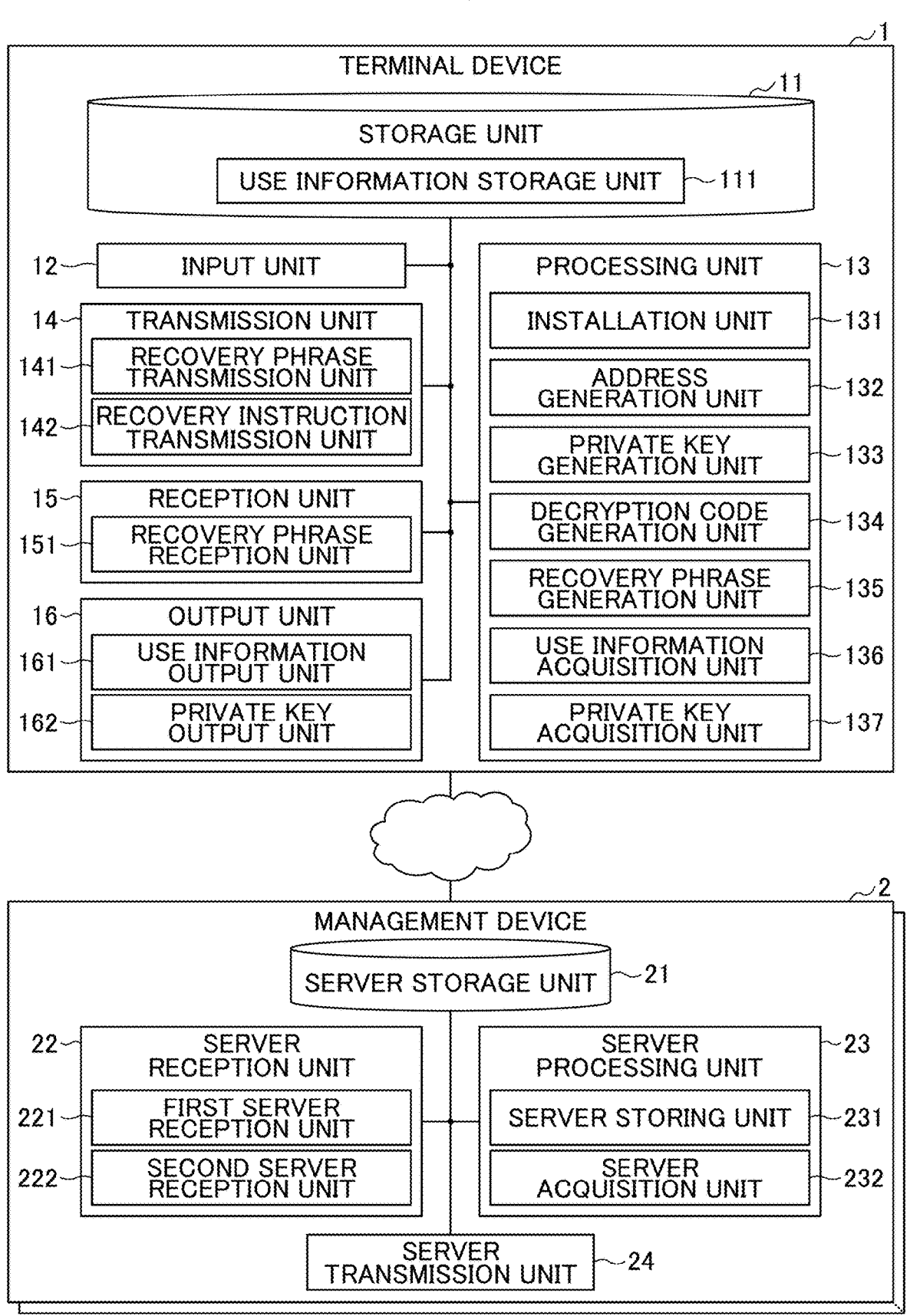
FIG. 2 is a block diagram of the information system A.

FIG. 2 is a block diagram of the information system A according to the present embodiment.

The terminal device 1 includes a storage unit 11, an input unit 12, a processing unit 13, a transmission unit 14, a reception unit 15, and an output unit 16. The storage unit 11 includes a use information storage unit 111. The processing unit 13 includes an installation unit 131, an address generation unit 132, a private key generation unit 133, a decryption code generation unit 134, a recovery phrase generation unit 135, a use information acquisition unit 136, and a private key acquisition unit 137. The transmission unit 14 includes a recovery phrase transmission unit 141 and a recovery instruction transmission unit 142. The reception unit 15 includes a recovery phrase reception unit 151. The output unit 16 includes a use information output unit 161 and a private key output unit 162.

The management device 2 includes a server storage unit 21, a server reception unit 22, a server processing unit 23, and a server transmission unit 24. The server reception unit 22 includes a first server reception unit 221 and a second server reception unit 222. The server processing unit 23 includes a server storing unit 231 and a server acquisition unit 232.

Various information are stored in the storage unit 11 constituting the terminal device 1. The various information is, for example, a wallet application, use information, which will be described later, and a user identifier. The storing of the wallet application may be the storing of an installer of the wallet application.

The wallet application is an application of a software wallet. Here, the wallet application is, for example, an application for a software wallet of crypto assets. However, the wallet application may be an application or the like that can collectively manage a credit card, a debit card, a shop card, a boarding pass, a movie ticket, a coupon, a point card, and the like, and is widely interpreted.

The user identifier is information for identifying a user. The user identifier is, for example, a mail address, a telephone number, a user ID, a session ID, or a terminal identifier. The terminal identifier is information for identifying the terminal device 1, and is, for example, an ID of the terminal device 1.

The use information storage unit 111 stores use information. The use information is information to be used when the private key is recovered. The use information is information based on a decryption code. The use information is, for example, image information in which the decryption code is embedded. However, the use information may be information other than the image information, such as a digital watermark or a character string. The image information is, for example, a code image. The code image is, for example, a two-dimensional code such as a barcode or a QR code (registered trademark). The use information may be the decryption code itself.

The decryption code is information for generating a recovery phrase. The decryption code is generally information generated at random. The decryption code is preferably information, having sufficient strength, that cannot be guessed. The decryption code is, for example, information acquired by giving a generated random number to a hash function.

Here, the recovery phrase is a phrase used when the private key is lost or the like. The phrase indicates information. The recovery phrase is information generated by performing reversible encryption on the private key by using the decryption code. The recovery phrase is generally a character string, but the data type is not limited.

The input unit 12 receives various instructions and information. The various instructions and information are, for example, an installation instruction, a management instruction, a recovery instruction, and various operations. The installation instruction is an instruction to install the wallet application. The management instruction is an instruction to output the use information for recovering the private key. The management instruction includes, for example, the user identifier. The recovery instruction is an instruction to recover the private key. The recovery instruction includes, for example, the user identifier. The recovery instruction is associated with, for example, the use information.

The various operations are, for example, access to the wallet by using a wallet address. However, the contents of the various operations are not limited.

Various instructions and information may be input by any input device, such as a touch panel, a keyboard and a mouse, or a menu screen.

The processing unit 13 performs various processes. The various processes are, for example, processes performed by the installation unit 131, the address generation unit 132, the private key generation unit 133, the decryption code generation unit 134, the recovery phrase generation unit 135, the use information acquisition unit 136, and the private key acquisition unit 137.

Additionally, the processing unit 13, for example, creates a data structure for transmitting various instructions and information received by the input unit 12. The processing unit 13, for example, creates a data structure for outputting the information received by the reception unit 15.

The installation unit 131 installs the wallet application in the terminal device 1. The installation unit 131 generally installs the wallet application in response to the reception of the installation instruction. The installation unit 131 installs, for example, the wallet application that is present in the storage unit 11. For example, when the wallet application is not present in the storage unit 11, the installation unit 131 acquires the wallet application from the management device 2 or another device, which is not illustrated, and installs the wallet application.

The address generation unit 132 generates the wallet address. Here, the wallet address is a character string associated with the wallet. The wallet address is a character string associated with a blockchain wallet, and is preferably a character string generated at random. The generation of the wallet address by the address generation unit 132 is triggered by, for example, the installation of the wallet application in the terminal device 1 by the installation unit 131. The address generation unit 132 generates a public key from the private key generated by the private key generation unit 133, which will be described later, for example. Here, in this case, the public key is, for example, the wallet address.

The private key generation unit 133 generates the private key of the software wallet. The private key here is information for accessing the wallet.

The decryption code generation unit 134 generates the decryption code. The decryption code generation unit 134 generally generates the decryption code at random. The decryption code generation unit 134 generates a random number, gives the random number to a hash function, executes the hash function, and acquires the decryption code, for example.

The recovery phrase generation unit 135 performs reversible encryption on the private key by using the decryption code to generate the recovery phrase. Here, the reversible encryption is encryption converting data into reversible data. Because the reversible encryption is known processing, a detailed description thereof will be omitted.

The use information acquisition unit 136 acquires use information based on the decryption code generated by the decryption code generation unit 134. The use information acquisition unit 136 generates, for example, image information in which the decryption code is embedded. The image information is, for example, a code image. The code image is, for example, a two-dimensional code such as a barcode or a QR code (registered trademark).

The private key acquisition unit 137 acquires the private key by using the recovery phrase received by the recovery phrase reception unit 151 and the decryption code associated with the use information. The private key acquisition unit 137 generally decrypts the decryption code associated with the use information with the recovery phrase received by the recovery phrase reception unit 151, and acquires the private key. Here, the decryption code associated with the use information is, for example, the decryption code embedded in the use information or the use information.

The transmission unit 14 transmits various information and instructions. The transmission unit 14 generally transmits various information and instructions to the management device 2. The various information and instructions are, for example, the installation instruction, the management instruction, the recovery instruction, and the recovery phrase. The recovery instruction is an instruction to recover the private key. The recovery instruction includes, for example, the user identifier.

The recovery phrase transmission unit 141 transmits the recovery phrase generated by the recovery phrase generation unit 135 to the management device 2 in association with the user identifier.

The recovery instruction transmission unit 142 transmits, to the management device 2, the recovery instruction associated with the user identifier. For example, when the input unit 12 receives the recovery instruction, the recovery instruction transmission unit 142 acquires the user identifier included in the recovery instruction or the user identifier in the storage unit 11. Next, the recovery instruction transmission unit 142 transmits, for example, the recovery instruction including the user identifier to the management device 2.

The reception unit 15 receives various information and the like. The various information and the like are, for example, the wallet application and the recovery phrase.

The recovery phrase reception unit 151 receives the recovery phrase associated with the user identifier from the management device 2 in response to the transmission of the recovery instruction.

The output unit 16 outputs various information. The various information are, for example, the use information and the private key.

The use information output unit 161 outputs the use information. The use information output unit 161 outputs the use information that is based on the decryption code.

Here, the outputting is a concept including displaying on a display, projecting using a projector, printing by a printer, outputting sound, transmitting to an external device, storing in a recording medium, passing a processing result to another processing device or another program, and the like.

The private key output unit 162 outputs the private key acquired by the private key acquisition unit 137. The private key output unit 162 displays the private key, for example. The private key output unit 162 prints the private key, for example. The private key output unit 162 passes the private key to the wallet application, for example.

The server storage unit 21 constituting the management device 2 stores various information and the like. The various information and the like are one or more user information and wallet applications. The user information is information related to the user of the wallet application. The user information includes, for example, the user identifier and the recovery phrase.

The server reception unit 22 receives various information. The various information are, for example, the recovery phrase, the recovery instruction, and the installation instruction.

The first server reception unit 221 receives the recovery phrase in association with the user identifier from the terminal device 1.

The second server reception unit 222 receives the recovery instruction in association with the user identifier from the terminal device 1.

The server processing unit 23 performs various processes. The various processes are, for example, processes performed by the server storing unit 231 and the server acquisition unit 232.

The server storing unit 231 stores the recovery phrase received by the first server reception unit 221 in association with the user identifier. The server storing unit 231 generally stores the user information including the recovery phrase and the user identifier in the server storage unit 21, but may store the user information in a device, which is not illustrated.

The server acquisition unit 232 acquires the user identifier associated with the recovery instruction received by the second server reception unit 222. The server acquisition unit 232 acquires the recovery phrase associated with the user identifier. The server acquisition unit 232 acquires, from the server storage unit 21, the recovery phrase associated with the user identifier associated with the recovery instruction received by the second server reception unit 222, for example.

The server transmission unit 24 transmits the recovery phrase acquired by the server acquisition unit 232 to the terminal device 1. The server transmission unit 24 may transmit the wallet application in the server storage unit 21 to the terminal device 1 in response to the reception of the installation instruction transmitted from the terminal device 1.

The storage unit 11, the use information storage unit 111, and the server storage unit 21 are preferably non-volatile recording media, but can also be realized by volatile recording media.

The process of storing information in the storage unit 11 or the like is not limited. For example, information may be stored in the storage unit 11 or the like via a recording medium, information transmitted via a communication line or the like may be stored in the storage unit 11 or the like, or information input via an input device may be stored in the storage unit 11 or the like.

The input unit 12 can be realized by a device driver of an input device such as a touch panel or a keyboard, control software of a menu screen, or the like.

The processing unit 13, the installation unit 131, the address generation unit 132, the private key generation unit 133, the decryption code generation unit 134, the recovery phrase generation unit 135, the use information acquisition unit 136, the private key acquisition unit 137, the server processing unit 23, the server storing unit 231, and the server acquisition unit 232 may be generally implemented by a processor, a memory, or the like. Processing procedures of the processing unit 13 and the like are generally implemented by software, and the software is recorded in a recording medium such as a ROM, but may be implemented by hardware (dedicated circuitry). Here, the processor may be a central processing unit (CPU), a micro processing unit (MPU), a graphic processing unit (GPU), or the like, and the type thereof is not limited.

The transmission unit 14, the recovery phrase transmission unit 141, the recovery instruction transmission unit 142, and the server transmission unit 24 are generally realized by wireless or wired communication network, but may be realized by a broadcasting system.

The reception unit 15, the recovery phrase reception unit 151, the server reception unit 22, the first server reception unit 221, and the second server reception unit 222 are generally realized by a wireless or wired communication network, but may be realized by a broadcasting system.

The output unit 16, the use information output unit 161, and the private key output unit 162 may be considered to include or not include an output device such as a display or a speaker. The output unit 16 can be realized by driver software of the output device, the driver software of the output device and the output device, or the like.

Next, an operation example of the terminal device 1 will be described with reference to a flowchart of FIG. 3.

(Step S301) The input unit 12 determines whether the installation instruction has been received. If the installation instruction is received, the process goes to step S302, and if the installation instruction is not received, the process goes to step S306.

(Step S302) The installation unit 131 determines whether the wallet application is present in the storage unit 11. If the application is present, the process goes to step S304, and if the application is not present, the process goes to step S303. Here, when the wallet application is present, the installer of the wallet application is generally present.

(Step S303) The installation unit 131 acquires the wallet application from the management device 2 or a device, which is not illustrated.

(Step S304) The installation unit 131 installs the wallet application stored in the storage unit 11 or the wallet application acquired in step S303.

(Step S305) The processing unit 13 and the like perform a use information generation process. The process returns to step S301. An example of the use information generation process will be described with reference to the flowchart of FIG. 4. Here, the use information generation process is a process of generating and outputting the use information.

(Step S306) The input unit 12 determines whether the management instruction has been received. If the management instruction is received, the process goes to step S305, and if the management instruction is not received, the process goes to step S307. Here, the case where the use information generation process is performed after the management instruction is received is a case where the use information generation process is not automatically performed in response to the installation of the wallet application.

(Step S307) The input unit 12 determines whether the recovery instruction has been received. If the recovery instruction is received, the process goes to step S308, and if the recovery instruction is not received, the process goes to step S309.

(Step S308) The private key acquisition unit 137 and the like perform a recovery process. The process returns to step S301. An example of the recovery process will be described with reference to the flowchart of FIG. 5. Here, the recovery process is a process of recovering the private key.

(Step S309) The input unit 12 determines whether another operation has been received. If another operation is received, the process proceeds to step S310, and if no other operation is received, the process returns to step S301. Here, another operation is, for example, an operation for the wallet application.

(Step S310) The processing unit 13 and the like perform processing corresponding to another operation. The process returns to step S301. Here, the processing corresponding to another operation is, for example, a process performed by the wallet application.

Here, in the flowchart of FIG. 3, the process is terminated by the power-off or by the interrupt for terminating the process.

Figure 4:
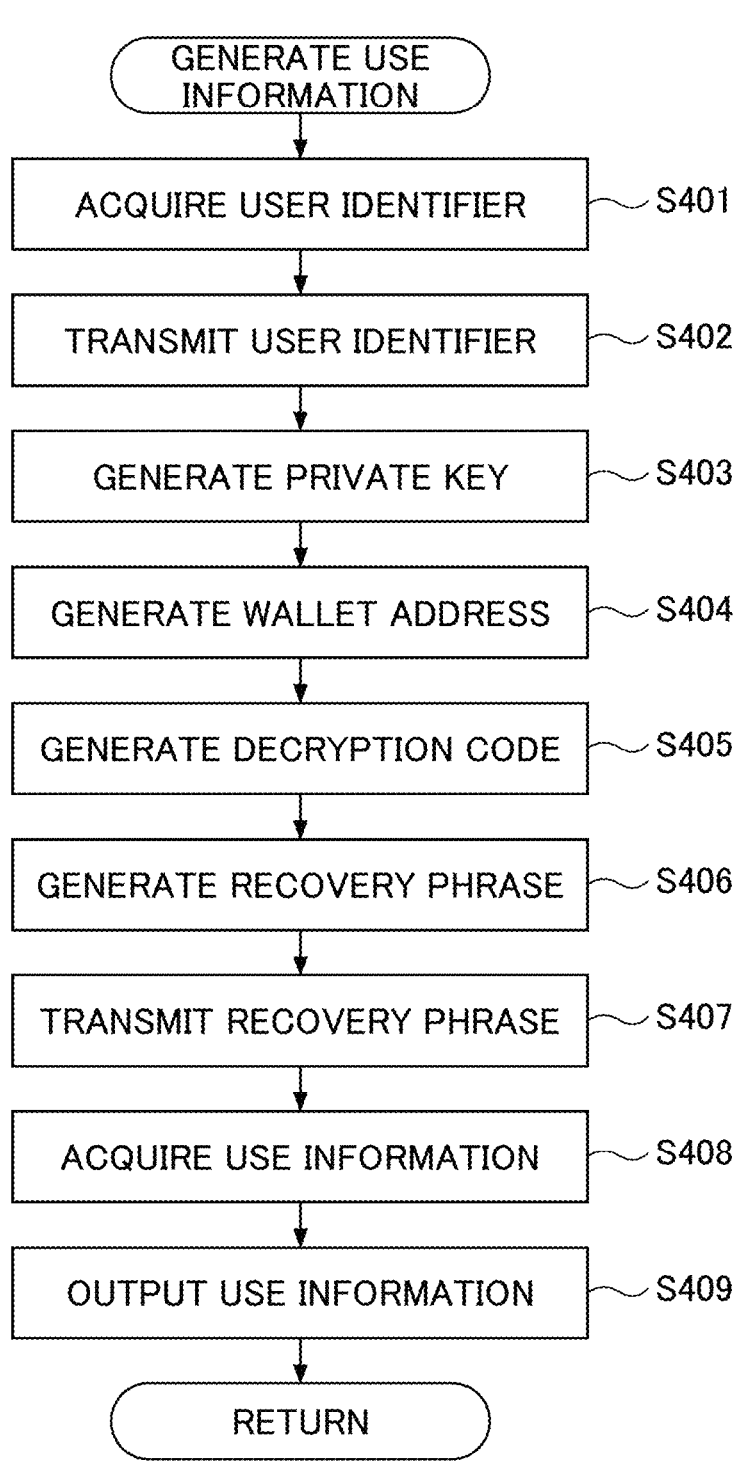
FIG. 4 is a flowchart for explaining an example of a use information generation process.

Next, an example of the use information generation process in step S305 will be described with reference to the flowchart of FIG. 4.

(Step S401) The processing unit 13 acquires the user identifier and the like. The user identifier and the like are, for example, the user identifier and an identifier of the terminal device 1 (for example, an IP address). The user identifier and the like may be only the user identifier.

(Step S402) The transmission unit 14 transmits, to the management device 2, the user identifier and the like acquired in step S401.

(Step S403) The private key generation unit 133 generates the private key.

(Step S404) The address generation unit 132 generates the wallet address and at least temporarily stores the wallet address in the storage unit 11.

(Step S405) The decryption code generation unit 134 generates the decryption code.

(Step S406) The recovery phrase generation unit 135 generates the recovery phrase by performing reversible encryption on the private key generated in step S404 by using the decryption code generated in step S405.

(Step S407) The recovery phrase transmission unit 141 transmits the recovery phrase generated in step S406 to the management device 2 in association with the user identifier.

(Step S408) The use information acquisition unit 136 acquires the use information that is based on the decryption code generated in step S405.

(Step S409) The use information output unit 161 outputs the use information acquired in step S408. The process returns to the upper-level process.

Figure 5:
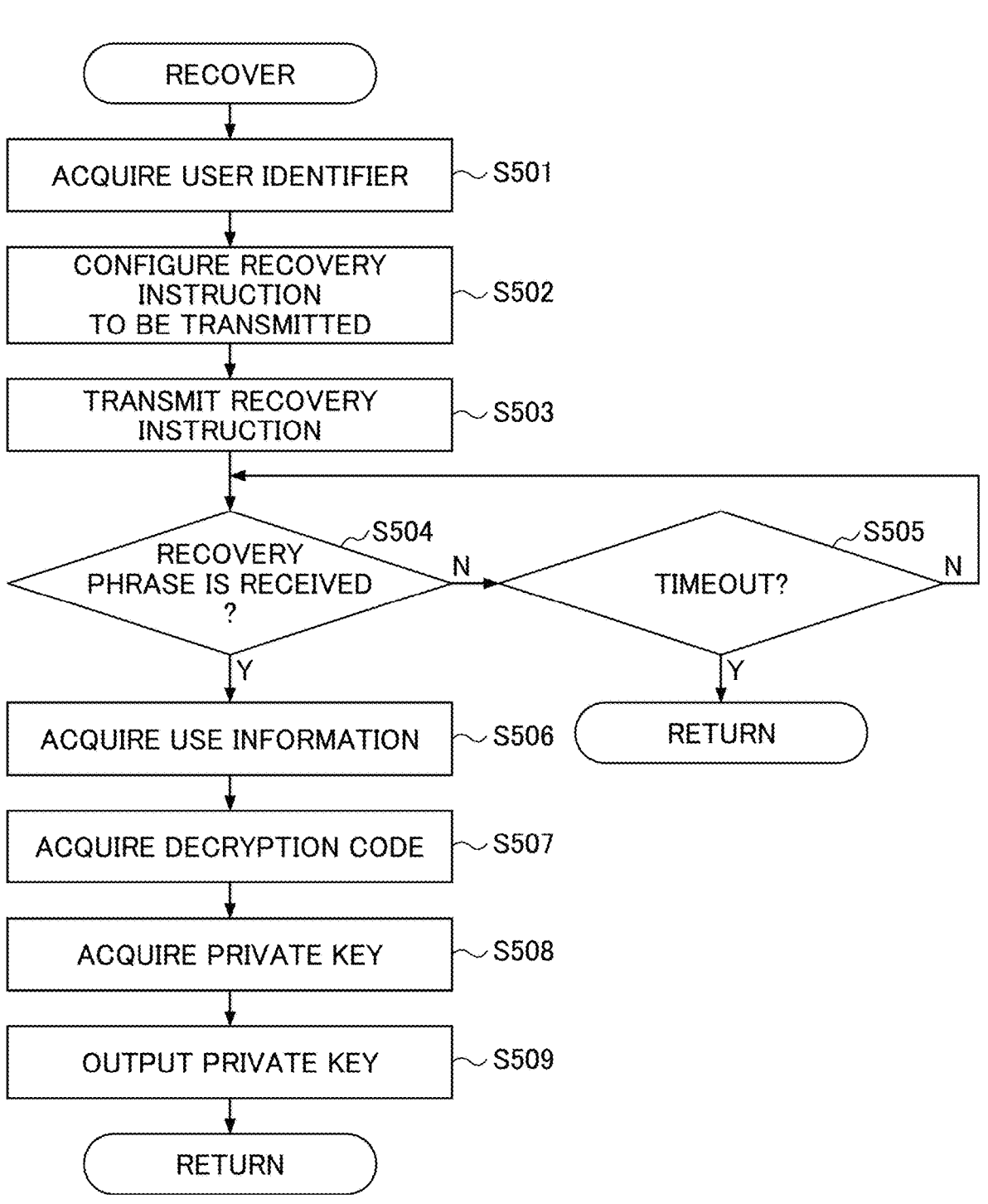
FIG. 5 is a flowchart for explaining an example of a recovery process.

Next, an example of the recovery process of step S308 will be described with reference to the flowchart of FIG. 5.

(Step S501) The recovery instruction transmission unit 142 acquires the user identifier from the storage unit 11.

(Step S502) The recovery instruction transmission unit 142 configures the recovery instruction including the user identifier.

(Step S503) The recovery instruction transmission unit 142 transmits, to the management device 2, the recovery instruction configured in step S502.

(Step S504) The recovery phrase reception unit 151 determines whether the recovery phrase has been received from the management device 2. If the recovery phrase is received, the process goes to step S506, and if the recovery phrase is not received, the process goes to step S505.

(Step S505) The processing unit 13 determines whether a timeout has occurred. If the timeout has occurred, the process returns to the upper-level process, and if the timeout has not occurred, the process returns to step S504. Here, the timeout indicates that a predetermined time or more has elapsed after the recovery instruction is transmitted.

(Step S506) The private key acquisition unit 137 acquires the use information from the storage unit 11. Here, the use information is, for example, the use information selected by the user.

(Step S507) The private key acquisition unit 137 acquires the decryption code from the use information acquired in step S506.

(Step S508) The private key acquisition unit 137 acquires the private key by decrypting the recovery phrase received in step S504 with the decryption code acquired in step S507.

(Step S509) The private key output unit 162 outputs the private key acquired in step S508. The process returns to the upper-level process.

Next, an operation example of the management device 2 will be described with reference to the flowchart of FIG. 6.

(Step S601) The server reception unit 22 determines whether the installation instruction has been received from the terminal device 1. If the installation instruction is received, the process goes to step S602, and if the installation instruction is not received, the process goes to step S603.

(Step S602) The server transmission unit 24 transmits the wallet application in the server storage unit 21 to the terminal device 1 that has transmitted the installation instruction. The process returns to step S601. Here, the wallet application to be transmitted is generally an installer of the wallet application.

(Step S603) The server reception unit 22 determines whether the user identifier and the like have been received from the terminal device 1. If the user identifier and the like are received, the process goes to step S604, and if the user identifier and the like are not received, the process goes to step S607.

(Step S604) The server storing unit 231 stores, in the server storage unit 21, the user identifier and the like received in step S603.

(Step S605) The first server reception unit 221 determines whether the recovery phrase has been received in association with the user identifier from the terminal device 1. If the recovery phrase is received, the process goes to step S606, and if the recovery phrase is not received, the process returns to step S605.

(Step S606) The server storing unit 231 stores, in the server storage unit 21, the recovery phrase received in step S605 in association with the user identifier. The process returns to step S601.

(Step S607) The second server reception unit 222 determines whether the recovery instruction associated with the user identifier has been received from the terminal device 1. If the recovery instruction is received, the process goes to step S608, and if the recovery instruction is not received, the process returns to step S601.

(Step S608) The server acquisition unit 232 acquires the user identifier associated with the recovery instruction received in step S607.

(Step S609) The server acquisition unit 232 acquires the recovery phrase associated with the user identifier acquired in step S608 from the server storage unit 21.

(Step S610) The server transmission unit 24 transmits the recovery phrase acquired in step S609 to the terminal device 1 that has transmitted the recovery instruction. The process returns to step S601.

Figure 6:
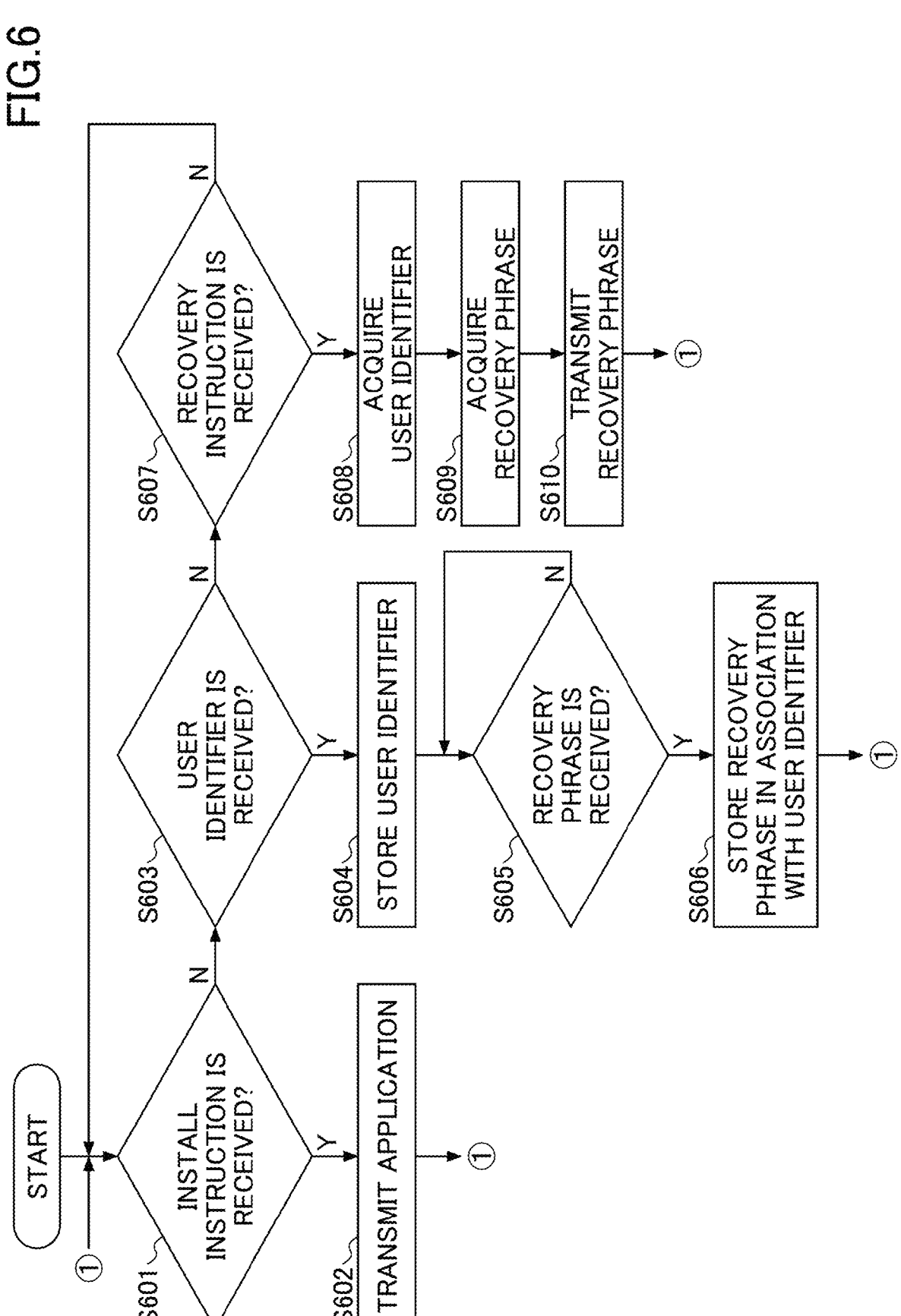
FIG. 6 is a flowchart for explaining an operation example of a management device 2.

Here, in the flowchart of FIG. 6, the process is terminated by the power-off or the interrupt for terminating the process.

In the following, a specific operation of the information system A in the present embodiment will be described. A conceptual diagram of the information system A is illustrated in FIG. 1.

Figures 7, 8:
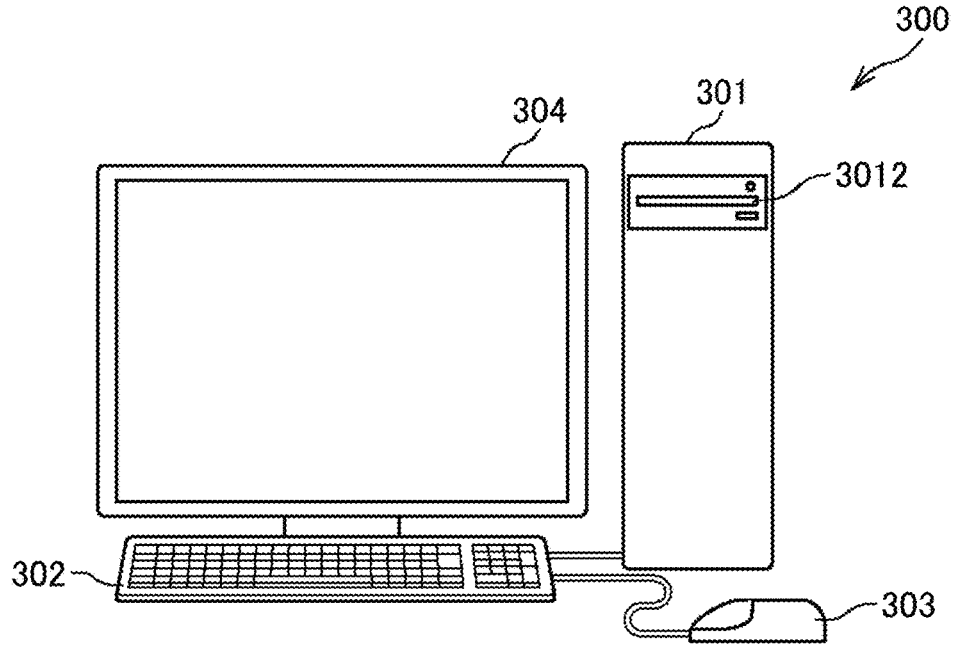
FIG. 7 is a diagram illustrating a user information management table.
FIG. 8 is a schematic view of a computer system.

It is assumed that a user information management table having a structure illustrated in FIG. 7 is stored in the server storage unit 21 of the management device 2. The user information management table manages one or more records including an "ID", a "user identifier", and a "recovery phrase". The "ID" is information for identifying a record. The "user identifier" here is a mail address or a telephone number. The "recovery phrase" here is a character string including characters that are equal to or greater than a threshold value in number. In such a situation, two specific examples will be described below. Specific Example 1 is the case of generating the use information. Specific Example 2 is the case of recovering the private key.

Specific Example 1

It is assumed that an installer of an application (wallet application) of a software wallet of crypto assets is stored in the storage unit 11 of the terminal device 1 of a user A, and then the user A inputs the installation instruction to the terminal device 1.

The input unit 12 of the terminal device 1 receives the installation instruction. The installation unit 131 executes the installer of the wallet application of crypto assets in the storage unit 11 to install the wallet application.

In response to the installation of the wallet application of crypto assets, the processing unit 13 and the like perform use information generation process as follows. That is, the processing unit 13 outputs, to the terminal device 1, a screen for prompting the user to input the mail address. Then, the user inputs a mail address "abc@x.com" on the screen. Next, the transmission unit 14 transmits the input mail address "abc@x.com" to the management device 2.

Next, the server reception unit 22 of the management device 2 receives the mail address "abc@x.com" from the terminal device 1. Next, the server storing unit 231 stores the mail address in the user information management table (FIG. 7) in the server storage unit 21.

Additionally, the address generation unit 132 of the terminal device 1 generates a wallet address "address 1". Additionally, the private key generation unit 133 generates the private key. Further, the decryption code generation unit 134 generates the decryption code. Next, it is assumed that the recovery phrase generation unit 135 generates a recovery phrase "XXXyyy0123" by performing reversible encryption on the private key by using the generated decryption code. Next, the recovery phrase transmission unit 141 transmits the generated recovery phrase "XXXyyy0123" to the management device 2 in association with the mail address "abc@x.com".

Next, the use information acquisition unit 136 configures the QR code in which the generated decryption code is embedded. Next, the use information output unit 161 stores the acquired QR code in the use information storage unit 111. Additionally, the use information output unit 161 displays the acquired QR code on the screen of the terminal device 1.

Additionally, the first server reception unit 221 of the management device 2 receives the recovery phrase "XXXyyy0123" from the terminal device 1 in association with the mail address "abc@x.com". Next, the server storing unit 231 stores the received recovery phrase "XXXyyy0123" in the user information management table (FIG. 7) in association with the mail address "abc@x.com". The record stored by the above processing is the record of "ID=1" in the user information management table (FIG. 7).

As described above, according to Specific Example 1, the use information for safely recovering the private key can be automatically acquired in response to the installation of the wallet application. That is, according to Specific Example 1, even if the user loses the private key, an environment, in which the private key can be safely recovered, can be provided.

Specific Example 2

It is assumed that the user A has lost the private key of the wallet application that the user A is using. The user A selects the QR code of the wallet application from one or more QR codes stored in the storage unit 11. Additionally, the user A inputs the recovery instruction including the mail address "abc@x.com" to the terminal device 1. Then, the input unit 12 of the terminal device 1 receives the recovery instruction including the mail address "abc@x.com". The private key acquisition unit 137 acquires the QR code from the storage unit 11.

Next, the recovery instruction transmission unit 142 acquires the input mail address "abc@x.com". Next, the recovery instruction transmission unit 142 configures the recovery instruction including the mail address "<recovery request>abc@x.com". Next, the recovery instruction transmission unit 142 transmits the recovery instruction to the management device 2.

Next, the second server reception unit 222 of the management device 2 receives the recovery instruction "<recovery request>abc@x.com" from the terminal device 1. Next, the server acquisition unit 232 acquires the mail address "abc@x.com" included in the received recovery instruction. Next, the server acquisition unit 232 acquires the recovery phrase "XXXyyy0123" associated with the acquired mail address from the user information management table (FIG. 7). Next, the server transmission unit 24 transmits the recovery phrase "XXXyyy0123" to the terminal device 1 of the user A.

Next, the recovery phrase reception unit 151 of the terminal device 1 receives the recovery phrase "XXXyyy0123" from the management device 2.

Next, the private key acquisition unit 137 acquires the decryption code embedded in the acquired QR code. Next, the private key acquisition unit 137 decrypts the received recovery phrase "XXXyyy0123" with the acquired decryption code to acquire the private key. Next, the private key output unit 162 outputs the acquired private key. Here, the private key output unit 162 at least temporarily stores the acquired private key in the storage unit 11, for example.

As described above, according to Specific Example 2, even if the user has lost the private key, the private key can be safely recovered.

As described above, according to the present embodiment, the private key can be safely recovered even when the private key of the software wallet is lost or the like. More specifically, according to the present embodiment, the management device 2 can safely recover the private key without receiving the private key or the elements necessary to recover the private key. Further, according to the present embodiment, two or more elements are required when the private key is recovered. Here, the two or more elements are the user identifier, the use information, and the recovery phrase.

The processes in the present embodiment may be implemented by software. The software may be distributed by software downloading or the like. Additionally, the software may be recorded on a recording medium such as a CD-ROM and distributed. This also applies to other embodiments in the present specification. Here, the software for realizing the terminal device 1 in the present embodiment is a program as described below. That is, the program causes a computer to function as a private key generation unit configured to generate a private key of a software wallet, a decryption code generation unit configured to generate a decryption code, a recovery phrase generation unit configured to generate a recovery phrase by performing reversible encryption on the private key by using the decryption code, and a recovery phrase transmission unit configured to transmit the recovery phrase to a management device in association with a user identifier.

The software for realizing the management device 2 in the present embodiment is a program as described below. That is, the program causes a computer to function as a first server reception unit configured to receive a recovery phrase in association with a user identifier from a terminal device, a server storing unit configured to store the recovery phrase in association with the user identifier, a second server reception unit configured to receive a recovery instruction associated with the user identifier from the terminal device, a server acquisition unit configured to acquire the recovery phrase associated with the user identifier associated with the recovery instruction, and a server transmitting unit configured to transmit the recovery phrase to the terminal device.

FIG. 8 illustrates an appearance of a computer that executes the program described in the present specification to realize the terminal device 1 and the management device 2 according to the various embodiments described above. The embodiments described above may be implemented by computer hardware and computer programs executed thereon. FIG. 8 is an overview of a computer system 300, and FIG. 9 is a block diagram of the computer system 300.

In FIG. 8, the computer system 300 includes a computer 301 including a compact disc read only memory (CD-ROM) drive, a keyboard 302, a mouse 303, and a monitor 304.

Figure 9:
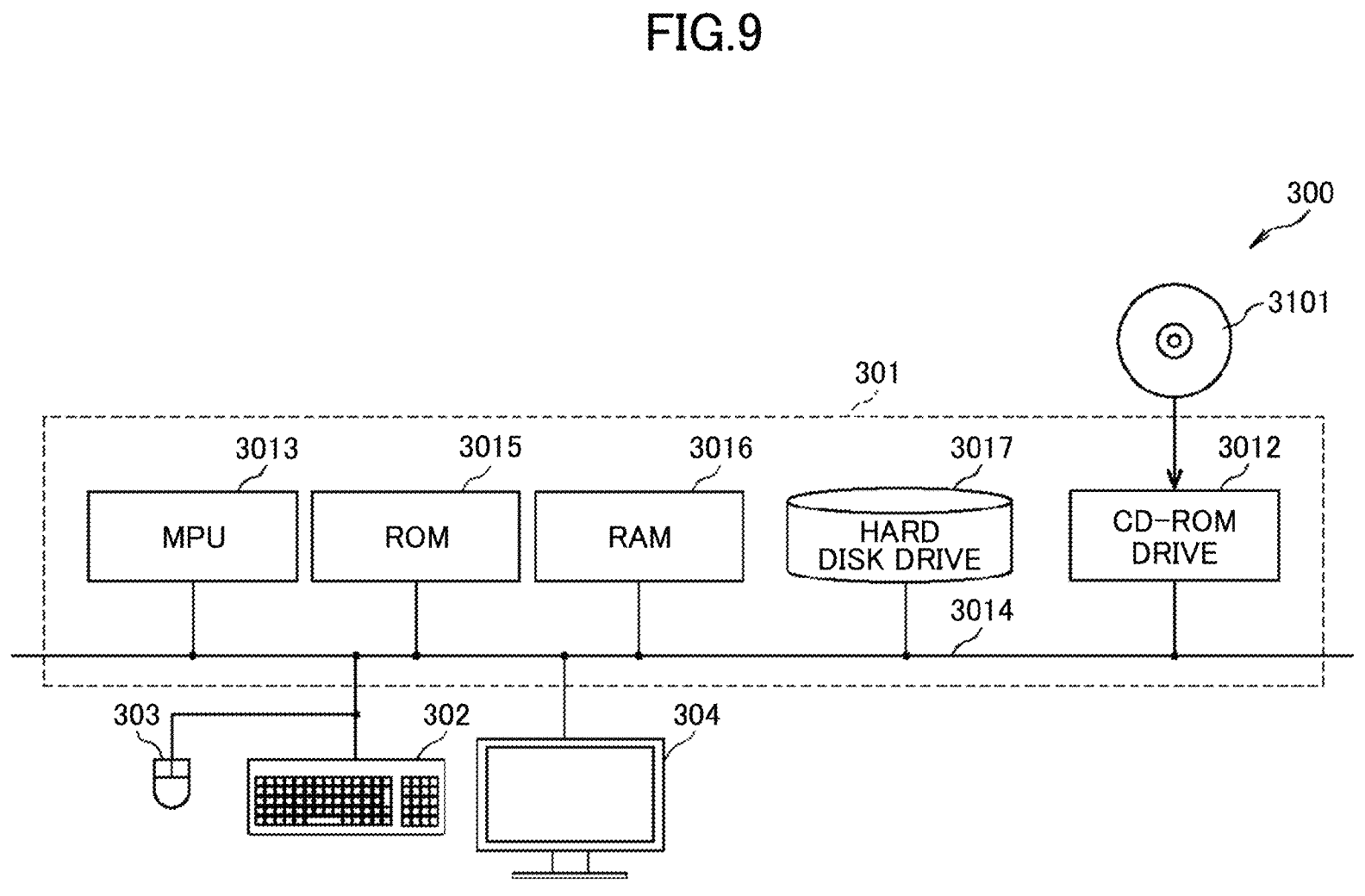

In FIG. 9, the computer 301 includes, in addition to a CD-ROM drive 3012, a micro-processing unit (MPU) 3013, a bus 3014 connected to the CD-ROM drive 3012 and the like, a read only memory (ROM) 3015 for storing programs such as a boot-up program, a random access memory (RAM) 3016 connected to the MPU 3013 for temporarily storing instructions of an application program and providing a temporary storage space, and a hard disk drive 3017 for storing an application program, a system program, and data. Although not illustrated, the computer 301 may further include a network card that provides a connection to a LAN.

The program for causing the computer system 300 to perform the functions of the terminal device 1 and the like according to the above-described embodiments may be stored in the CD-ROM 3101, inserted into the CD-ROM drive 3012, and transferred to the hard disk drive 3017. Alternatively, the program may be transmitted to the computer 301 via a network (not illustrated) and stored in the hard disk drive 3017. The program is loaded into the RAM 3016 at the time of execution. The program may be loaded directly from the CD-ROM 3101 or the network.

The program need not necessarily include an operating system (OS), a third-party program, or the like that causes the computer 301 to perform the functions of the terminal device 1 or the like according to the above-described embodiments. The program may include only a portion of instructions that call appropriate functions (modules) in a controlled manner to achieve a desired result. How the computer system 300 operates is well known and will not be described in detail.

Here, in the above-described program, a step of transmitting information, a step of receiving information, and the like do not include processing performed by hardware, for example, processing performed by a modem or an interface card (processing performed only by hardware) in the step of the transmitting.

The computer that executes the program may be a single computer or multiple computers. That is, centralized processing may be performed, or distributed processing may be performed.

In the above embodiments, two or more communication networks in one apparatus may be physically implemented by one medium.

In the above-described embodiments, each process may be realized by a single device performing centralized processing, or may be realized by multiple devices performing distributed processing.

In the above-described embodiments, the use information generated based on the decryption code is stored in the terminal device and the recovery phrase is transmitted to the server. However, the use information generated based on the decryption code may be transmitted to the server and the recovery phrase may be stored in the terminal device.

The present invention is not limited to the above embodiments, and various modifications can be made, and naturally, they are also included in the scope of the present invention.

INDUSTRIAL APPLICABILITY

As described above, the terminal device 1 according to the present invention has an effect of safely recovering, when a private key of a software wallet is lost or the like, the private key, and is useful as a terminal or the like on which an application of a software wallet of crypto assets operates.

What is claimed is:

1. An information processing method comprising:
   causing a terminal device of a user to generate first information and second information that are required to recover a private key of a software wallet of the user, wherein the first information is generated by reversibly encrypting the private key with the second information, or the second information is generated by reversibly encrypting the private key with the first information;

causing the terminal device to transmit, to a server, the second information in association with a user identifier; and causing the server to transmit the second information to the terminal device, in response to an event in which the server receives, from the terminal device, the user identifier and a request for the second information.

2. The information processing method as claimed in claim 1, further comprising:

causing the terminal device to store the generated first information in the terminal device; and causing the terminal device to recover the private key, using the first information that is stored in the terminal device and the second information that is transmitted from the server in response to the request.

3. The information processing method as claimed in claim 1, further comprising:

causing the terminal device to generate the private key of the software wallet, wherein the first information is a decryption code, and wherein the second information is a recovery phrase generated by performing reversible encryption on the private key by using the decryption code.

4. The information processing method as claimed in claim 1, wherein when generating the first information and the second information, the first information is stored in the terminal device without being transmitted to the server, and the second information is transmitted to the server without being stored in the terminal device.

5. The information processing method as claimed in claim 1, further comprising:

generating an image in which the first information is embedded.

6. The information processing method as claimed in claim 5, wherein the image is a QR code.

7. The information processing method as claimed in claim 1, wherein the user identifier is a telephone number.

8. The information processing method as claimed in claim 1, wherein the user identifier is an email address.

9. An information processing method comprising:

generating a private key of a software wallet;

generating a decryption code;

generating a recovery phrase by performing reversible encryption on the private key by using the decryption code; and transmitting, to a management device, the recovery phrase in association with a user identifier.

10. The information processing method as claimed in claim 9, further comprising:

causing the management device to transmit the recovery phrase to a terminal device, in response to an event in which the management device receives, from the terminal device, the user identifier and a request for the recovery phrase.

11. An information processing method comprising:

causing a terminal device of a user to generate a private key of a software wallet;

causing the terminal device to generate a decryption code and a recovery phrase that are required to recover the private key of the software wallet of the user, wherein the recovery phrase is generated by performing reversible encryption on the private key by using the decryption code;

causing the terminal device to transmit, to a server, the recovery phrase in association with a user identifier; and causing the server to transmit the recovery phrase to the terminal device, in response to an event in which the server receives, from the terminal device, the user identifier and a request for the recovery phrase.

12. The information processing method as claimed in claim 11, further comprising:

causing the terminal device to store the generated decryption code in the terminal device; and causing the terminal device to recover the private key, using the decryption code that is stored in the terminal device and the recovery phrase that is transmitted from the server in response to the request.

13. The information processing method as claimed in claim 11, wherein when generating the decryption code and the recovery phrase, the decryption code is stored in the terminal device without being transmitted to the server, and the recovery phrase is transmitted to the server without being stored in the terminal device.

14. The information processing method as claimed in claim 11, further comprising:

generating an image in which the decryption code is embedded.

15. The information processing method as claimed in claim 14, wherein the image is a QR code.

16. The information processing method as claimed in claim 11, wherein the user identifier is a telephone number.

17. The information processing method as claimed in claim 11, wherein the user identifier is an email address.

* * * * *